United States Patent
Zaslavsky et al.

(10) Patent No.: US 9,063,971 B2
(45) Date of Patent: Jun. 23, 2015

(54) SCHEMA AND QUERY ABSTRACTION FOR DIFFERENT LDAP SERVICE PROVIDERS

(71) Applicant: Red Hat Israel, Ltd., Raanana (IL)

(72) Inventors: Yair Zaslavsky, Netanya (IL); Roy Golan, Raanana (IL); Oved Ourfalli, Petach Tikva (IL)

(73) Assignee: Red Hat Israel, Ltd., Raanana (IL)

( * ) Notice: Subject to any disclaimer, the term of this patent is extended or adjusted under 35 U.S.C. 154(b) by 387 days.

(21) Appl. No.: 13/692,457

(22) Filed: Dec. 3, 2012

(65) Prior Publication Data

US 2014/0156684 A1    Jun. 5, 2014

(51) Int. Cl.
*G06F 17/30* (2006.01)

(52) U.S. Cl.
CPC .... *G06F 17/30389* (2013.01); *G06F 17/30569* (2013.01); *G06F 17/30589* (2013.01)

(58) Field of Classification Search
CPC .......................... G06F 17/30069; H04L 67/42
USPC ........... 707/756, 763; 709/201, 203, 220, 223
See application file for complete search history.

(56) References Cited

U.S. PATENT DOCUMENTS

| | | | |
|---|---|---|---|
| 6,732,160 B2 * | 5/2004 | Ambrosini et al. | 709/218 |
| 7,873,678 B2 * | 1/2011 | Tonev et al. | 707/805 |

* cited by examiner

*Primary Examiner* — Cheryl Lewis
(74) *Attorney, Agent, or Firm* — Lowenstein Sandler LLP

(57) ABSTRACT

A lightweight directory access (LDAP) broker receives user information associated with a query for information in an LDAP repository. The query may be in an abstraction format. The LDAP broker determines a computing domain in view of the user information and retrieves a configuration file associated with the computing domain. The configuration file comprises a mapping for the query between an abstraction format and a vendor specific format. The LDAP broker converts the query to the vendor specific format in view of the mapping in the configuration file.

21 Claims, 6 Drawing Sheets

SCHEMA AND QUERY ABSTRACTION FOR DIFFERENT LDAP SERVICE PROVIDERS

TECHNICAL FIELD

This disclosure relates to the field of virtualization and, in particular, to schema and query abstraction for different LDAP service providers.

BACKGROUND

Virtualization allows multiplexing of the underlying host machine between different virtual machines. The host computer allocates a certain amount of its resources to each of the virtual machines. Each virtual machine is then able to use the allocated resources to execute applications, including operating systems (referred to as guest operating systems). The software layer providing the virtualization is commonly referred to as a hypervisor and is also known as a virtual machine monitor (VMM), a kernel-based hypervisor or a host operating system. The hypervisor emulates the underlying hardware of the host computer, making the use of the virtual machine transparent to the guest operating system and the user of the virtual machine.

When a user logs into a management console of the virtual machine system with their user credentials, makes a request of the system, or issues a command in the system, a management service looks up the information (e.g., user privileges, object names) in a directory service. One example of a directory service is lightweight directory access protocol (LDAP). Certain virtualization systems may have multiple LDAP directory services, possibly provided by different vendors. Some examples of LDAP directory services include Red Hat Directory Server (RHDS), Microsoft Active Directory, and Tivoli-DS from IBM. Each LDAP directory service may store the same or similar types of information, however, each provider may have a different schema, query syntax, and/or authentication protocols. The LDAP schema defines what objects are included in the directory service and what attributes can be used for those objects (e.g., user name, group, title). The query syntax defines the format of LDAP requests that can be processed by the directory service. The authentication protocols define how a user is verified to determine if they should have access to the information in the directory service. Conventionally there is no method for virtualization managers to easily switch between different directory services and to convert communications to the appropriate schema and query syntax.

BRIEF DESCRIPTION OF THE DRAWINGS

The present disclosure is illustrated by way of example, and not by way of limitation, in the figures of the accompanying drawings.

DETAILED DESCRIPTION

Figure 1:
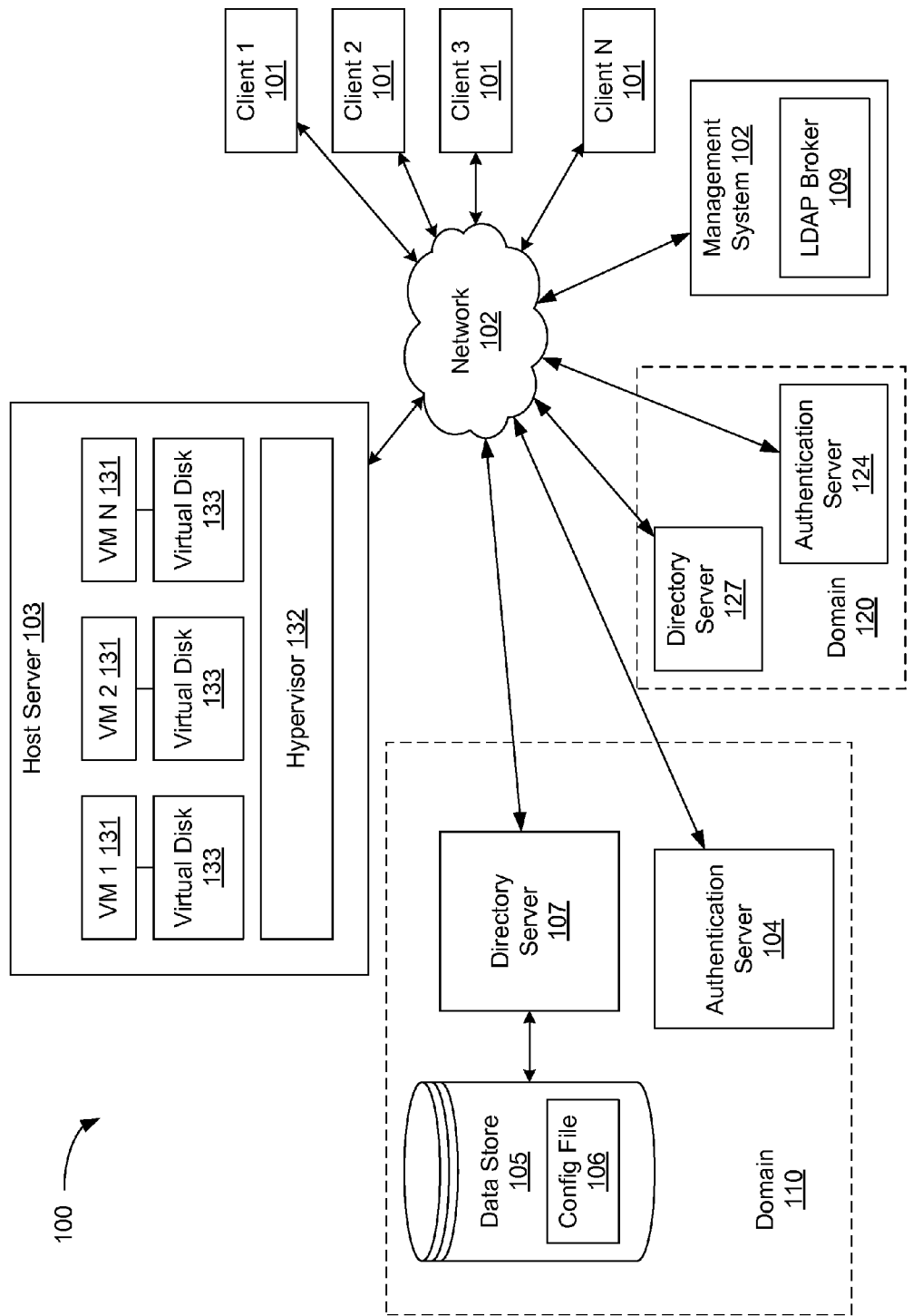
FIG. 1 is a block diagram illustrating an exemplary network architecture in which embodiments of the present invention may operate.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Described herein is a method and system for schema and query abstraction for different lightweight directory access protocol (LDAP) service providers. In one embodiment, a number of virtual machines and virtual disks are managed by a management system. In one embodiment, a command or request may be issued by a user or application (e.g., through a client device) to perform some action, such as a request for information about a user of a virtual machine or a command to start or stop a virtual machine. The command or request may be received by the management system, which may verify information about the user (e.g., log-in credentials and permissions) using a directory service, such as one using the LDAP protocol.

In one embodiment, the network architecture includes one or more computing domains. Each domain may include one or more server computers, such as a directory server, an authentication server and an LDAP repository. The directory server may maintain the LDAP repository in a connected data store. The clients may request data from the directory server by submitting requests using the LDAP protocol. The LDAP repository may contain a tree of data entries storing information about users of the virtual machines in the network. The structure of the entries is specified by an LDAP schema, which may reside independently or inside the LDAP repository. In one embodiment, a vendor or manufacturer of the directory server may have a vendor-specific schema and query syntax for querying the LDAP repository for the information about the users of the virtual machines.

Each other domain in the network may include a separate authentication server and directory server. The functionality of these servers may be similar to the corresponding servers in the first domain. In one embodiment, if the directory servers in each domain are provided by different vendors or manufacturers, the associated LDAP repositories may use a different LDAP schema. In addition, there may be a different query syntax and/or authentication protocol(s) than is used by the servers in domain 110. In one embodiment, in order to abstract the object names and attributes, the query syntax and the authentication protocols into a common form, the management system may include an LDAP broker. The LDAP broker maintains a series of mappings between the object names and attributes, the query syntax and the authentication protocols for each domain in the network architecture. In one embodiment, the mappings are provided in a configuration file that is stored, for example, in the LDAP repository. Each directory server may have a corresponding configuration file that maps the vendor-specific schema, query syntax and authentication protocols into a common form that can be used by all domains. By having the mappings in a configuration file, rather than embedded in the actual code run by the directory server, it is significantly faster and easier to add support for a new vendor, since recompiling the code is not necessary.

In other embodiments, the abstraction techniques described herein may be used in other implementations besides the schema and query syntax for LDAP. For example, the management system may include an internal broker that is used for abstraction when accessing a local database. In this case, if a user is unaware of the proper schema or syntax or makes a mistake, the command or request can be abstracted to a proper form without causing any error. In addition, the abstraction techniques may be implemented in conjunction with a single sign-on (SSO) system that provides access to multiple programs or services. In this case, the user may sign-in once using a single set of user credentials (e.g., user name, password, private key), and be granted access to the multiple programs and/or service. In addition, the user may be able to make a single command or request in abstracted form, which is then translated by the broker into the appropriate schema and syntax for each individual program or service.

In the case of a non-LDAP abstraction, the management system may provide an interface (e.g., a Java interface) that may be implemented by a third party. The interface may include definitions of schema (e.g., object names) and query syntax, and optionally, an authentication method used by the associated systems. In one embodiment, the interface may also rely on configuration files to store the abstraction mappings. For example, the configuration file may have an entry indicating the context (e.g., LDAP, SSO) in which the abstraction will be used, so that the mapping entries may be properly recognized. For ease of discussion, the following description will be in reference to an LDAP implementation. It should be understood, however, that the methods and techniques may be equally applied to non-LDAP cases as well.

FIG. 1 illustrates an exemplary network architecture 100 in which embodiments of the present invention may operate. The network architecture 100 includes one or more host servers 103 coupled to clients 101 over a network 102. The network 102 may be a private network (e.g., a local area network (LAN), wide area network (WAN), intranet, etc.) or a public network (e.g., the Internet). The host servers 103 may also be coupled to a management system 102 (via network 102, some other network or directly), which may reside, for example on a host controller. The host controller may be an independent machine such as a server computer, a desktop computer, etc. Alternatively, the management system 102 may be part of a host server 103.

In one embodiment, the clients 101 may include computing devices that have a wide range of processing capabilities. Some or all of the clients 101 may be thin clients, which serve as access terminals for users and depend primarily on the host servers 103 for processing activities. For example, the client 101 may be a desktop computer, laptop computer, cellular phone, personal digital assistant (PDA), etc. The client 101 may run client applications such as a Web browser. The client 101 may also run other client applications, which receive multimedia data streams or other data from the host server 103 and re-direct the received data to a local display or other user interface.

Host servers 103 may include server computers or any other computing devices capable of running one or more virtual machines 131. Each virtual machine 131 runs a guest operating system (OS) that may be different from one virtual machine to another. The guest OS may include Microsoft Windows, Linux, Solaris, Mac OS, etc. The host server 103 may include a hypervisor 132 that emulates the underlying hardware platform for the virtual machines 131. The hypervisor 132 may also be known as a virtual machine monitor (VMM), a kernel-based hypervisor or a host operating system.

Each virtual machine 131 can be accessed by one or more of the clients 101 over the network 102 and can provide a virtual desktop for the client(s) 101. From the user's point of view, the virtual desktop functions as a physical desktop (e.g., a personal computer) and is indistinguishable from a physical desktop. Each virtual machine 131 may be linked to one or more virtual disks 133. These virtual disks 133 can be logical partitions of a physical disk managed by hypervisor 132, can be cloud based storage devices, or can be some other type of virtual storage device. In one embodiment, virtual disks 133 may form a whole or part of a logical data center. In one embodiment, virtual machines 131 and virtual disks 133, together with host servers 103, may be collectively referred to as entities in a virtual machine system.

The virtual machines 131 and virtual disks 133 are managed by the management system 102. Management system 102 may manage the allocation of resources from host server 103 to virtual machines 131. In addition, management system 102 may monitor the state of virtual machines 131 as well as the progress of commands and processes being executed by virtual machines 131 and/or on virtual machines 131. In one embodiment, a command or request may be issued by a user or application (e.g., through one of clients 101) to perform some action. The command or request may be received by management system 102, which may verify information about the user (e.g., log-in credentials and permissions) using a directory service based on a protocol such as Lightweight Directory Access Protocol (LDAP). Examples of the directory services that use LDAP include ActiveDIrectory, Tivoli-DS, RHDS, and other services.

In one embodiment, the network architecture 100 further includes one or more domains 110, 120. Each domain 110, 120 is a logical construct that may include one or more server computers, desktop computers etc. For example domain 110 includes authentication server 104 and directory server 107. In certain embodiments, authentication server 104 and directory server 107 may reside on separate physical machines. In other embodiments, they may reside on the same physical machine. Authentication server 104 (e.g., Kerberos domain controller (KDC)) may be responsible for authenticating client devices 101 and/or their users (i.e., users of client devices 101) prior to allowing access to directory server 107. Kerberos is one example of an authentication method used by authentication server 104. In other embodiments, some other authentication method may be used, such as for example, SIMPLE, MD5-DIGEST, OPENID, or some other method.

Directory server 107 (e.g., an LDAP directory server) maintains an LDAP repository in data store 105. The data store 105 may share the machine with the directory server 107 (e.g., a disk drive in the directory server computer) or be an independent device coupled to the directory server directly or via a network (e.g., as a network-attached storage device (NAS)). Clients 101 may request data from the directory server 107 by submitting requests using the LDAP protocol. The LDAP repository may contain a tree of data entries storing information about users of the virtual machines in the network. The structure of the entries is specified by an LDAP schema, which may reside independently or inside the LDAP repository. For example, the schema may define object classes and attributes associated with each object class. Each entry in the LDAP repository may have an object class attribute (e.g., objectClass, or some other name depending on the vendor), containing one or more classes defined in the schema. For each class an entry belongs to, the schema defines what kind of object the entry may represent (e.g., a person, organization or domain). Depending on the class, an entry may have a set of mandatory attributes and a set of optional attributes. For example, an entry that belongs to the "person" class would contain mandatory attributes such as surname ("sn") and common name ("cn"), and optional attributes such as "userPassword", "telephoneNumber", and others. In one embodiment, a vendor or manufacturer of directory server 107 may have a vendor-specific schema and query syntax for querying the LDAP repository. Thus, in services provided by other vendors, the names of the above referenced attributes may vary.

Domain 120 may include authentication server 124 and directory server 127. The functionality of these servers may be similar to the corresponding servers in domain 110. Directory server 127 may maintain a separate LDAP repository storing different data. In one embodiment, if directory server 127 is provided by a different vendor or manufacturer, the associated LDAP repository may use a different LDAP schema. In addition, there may be a different query syntax and authentication protocol than is used by the servers in domain 110. In one embodiment, in order to abstract the object names and attributes, the query syntax and the authentication protocols into a common form, management system 102 may include LDAP broker 109. LDAP broker 109 maintains a series of mappings between the object names and attributes, the query syntax and the authentication protocols for domains 110, 120 and other domains in the network architecture. In one embodiment, the mappings are provided in a configuration file 106 that is stored, for example, in the LDAP repository in data store 105. Each directory server 107 may have a corresponding configuration file 106 that maps the vendor-specific schema, query syntax and authentication protocols into a common form that can be used by all domains.

Figure 2:
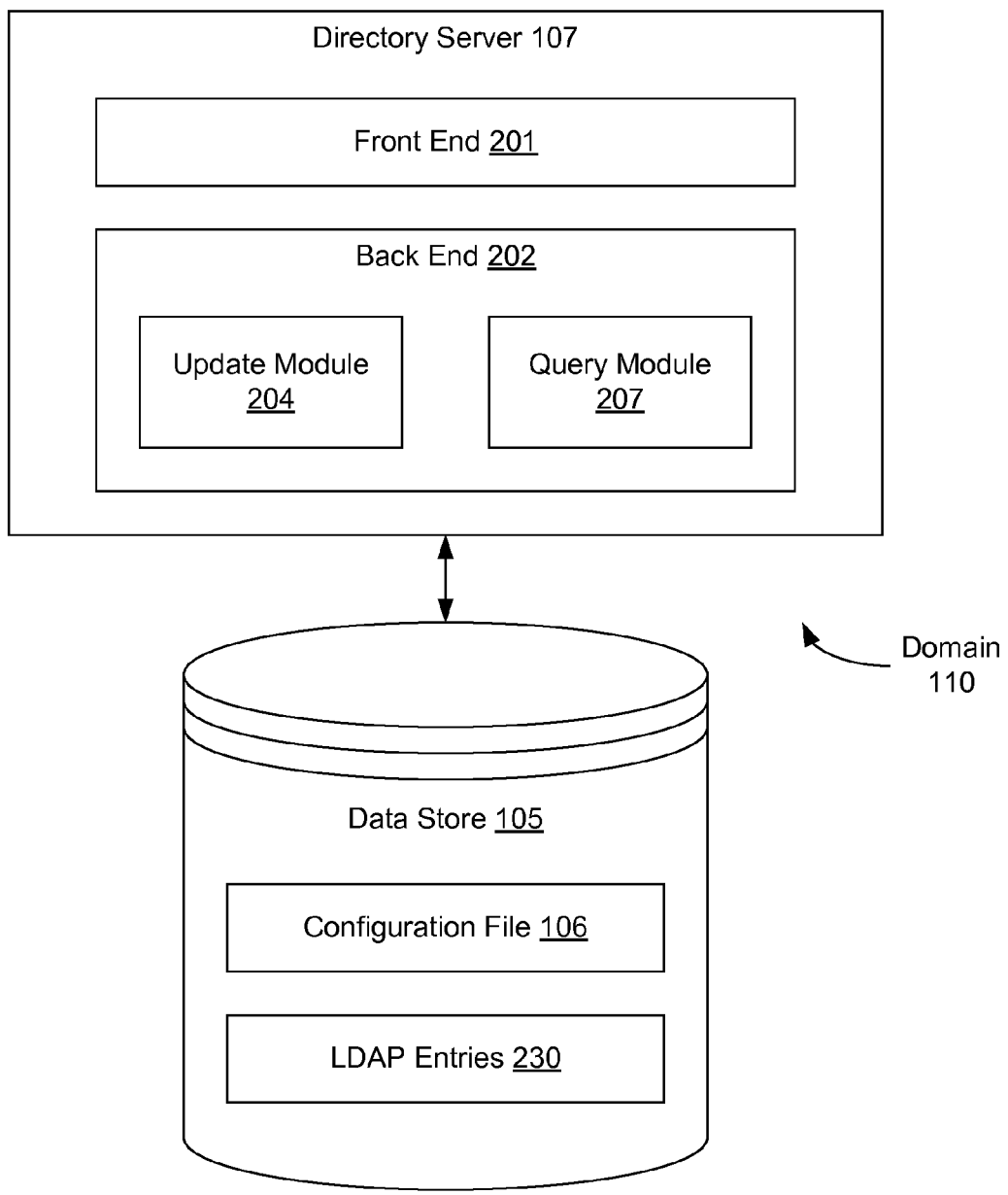
FIG. 2 is a block diagram illustrating a directory server, according to an embodiment.

FIG. 2 is a block diagram illustrating directory server 107, according to an embodiment of the present invention. In one embodiment, directory server 107 includes front end 201 and back end 202. The back end 202 may further include update module 204 and query module 207. This arrangement of modules may be a logical separation, and in other embodiments, these modules or other components can be combined together or separated in further components, according to a particular implementation. In one embodiment, directory server 107 is connected to data store 105, which includes configuration file 106, and LDAP entries 230. In other embodiments, directory server 107 may include different and/or additional components, which are not shown in order to simplify the description. Data store 105 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one embodiment, the front end of 201 of directory server 107 determines the type of incoming request (e.g., a search request (query) or an update request) and passes the parsed information to the back end 202. The update module 204 of back end 202 performs update operations (e.g., add, delete, modify) to the LDAP entries 230 in data store 105. The query module 207 may perform search operations on LDAP entries 230. In response to a query, back end 202 returns retrieved values to the front end 201 for transmitting a reply to the source of the request (e.g., client 101).

In one embodiment, data store 105 stores configuration file 106. A configuration file (or config file) configures the initial settings for some computer programs. Some computer programs only read their configuration files at startup. Others periodically check the configuration files for changes. Users or other software modules can instruct some programs to re-read the configuration files and apply the changes to the current process. Configuration files are beneficial because they can introduce new settings for the current process without having to recompile the entire program. In one embodiment, configuration file 106 includes a mapping for the schema, query syntax, and/or authentication protocols used by the vendor or directory server 107. The mapping may indicate what object names or attributes and what query structures used for LDAP entries 230 relate to a common form used by LDAP broker 109. Additional details of configuration file 106 are discussed below with respect to FIG. 4. In one embodiment, each domain, such as domain 120, may have a similar configuration file (not shown) that has mappings specific to the corresponding directory server.

Figure 3:
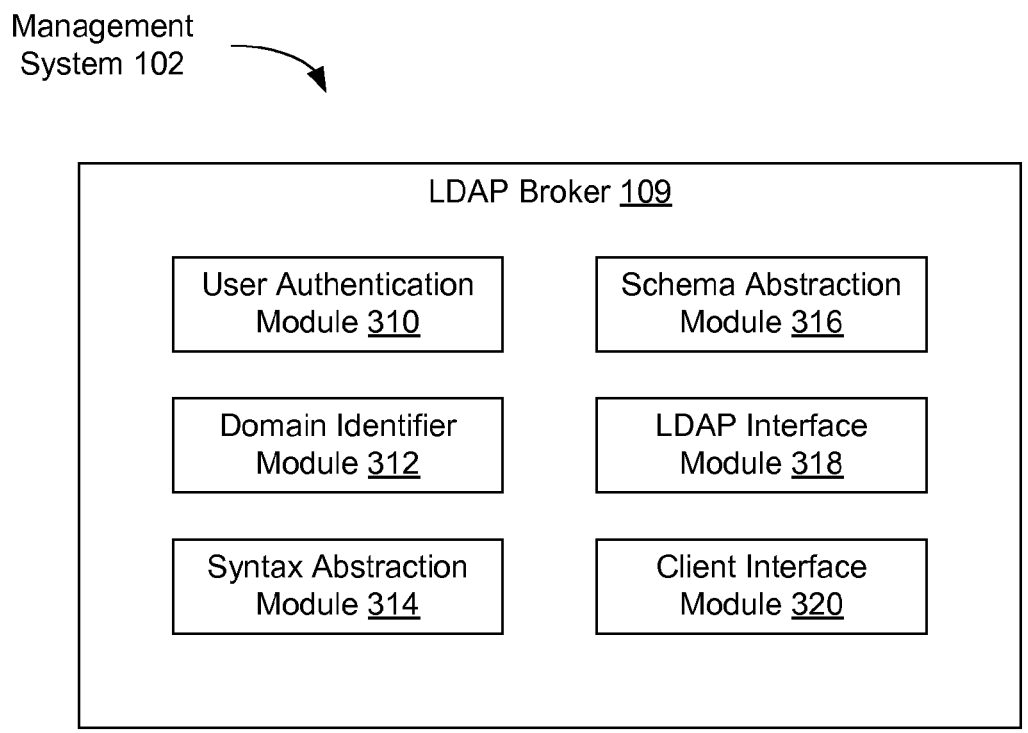
FIG. 3 is a block diagram illustrating an LDAP broker, according to an embodiment.

FIG. 3 is a block diagram illustrating LDAP broker 109, according to an embodiment of the present invention. In one embodiment, LDAP broker 109 includes user authentication module 310, domain identifier module 312, syntax abstraction module 314, schema abstraction module 316, LDAP interface module 318 and client interface module 320. This arrangement of modules may be a logical separation, and in other embodiments, these modules or other components can be combined together or separated in further components, according to a particular implementation. In one embodiment, management system 102 includes LDAP broker 109. In other embodiments, LDAP broker 109 may be located elsewhere, such as on host server 103 or on directory servers 107, 127.

In one embodiment, client interface module 320 receives user information in response to the user logging in to a client device 101 or in response to the user issuing a request or command directed, for example, to a virtual machine 131, virtual disk 133, or one of directory servers 107, 127. In one embodiment, the user information may include an identifier (e.g., user credentials) of the user. If the user is already logged in to the management system, the user information may be accompanying a request or command to perform some action or retrieve some data.

In one embodiment, user authentication module 310 authenticates the user based on the received user information. For example if the user information includes a username and password, authentication module 310 may compare the provided credentials to those stored in a database of authorized users. If the credentials are correct, authentication module 310 may permit access for the user to the management system 102. In one embodiment, authentication module 310 uses the Kerberos protocol or some other authentication protocol. Kerberos, for example, works on the basis of "tickets" to allow nodes communicating over a non-secure network to prove their identity to one another in a secure manner. Its design is aimed primarily at a client-server model, and it provides mutual authentication where both the user and the server verify each others identity. Kerberos protocol messages are protected against eavesdropping and replay attacks. Kerberos builds on symmetric key cryptography and requires a trusted third party, and optionally may use public-key cryptography during certain phases of authentication. In other embodiments, depending on which domain and directory server 107, 127, the user is attempting to access, different authentication protocols may be used, such as for example, digest access authentication, SIMPLE authentication, or others.

In one embodiment, domain identifier module 312 determines which domain 110, 120 is associated with the user. In one embodiment, the user information includes an indicator of which domain the user is a member of or which domain the user is attempting to access. In another embodiment, domain identifier module 312 maintains a list or other data structure of which user's belong to which domains 110, 120. Thus, in response to receiving the user identifier, domain identifier module 312 can perform a look-up operation on the data structure to determine which domain or domains the user is a member of and/or which domains the user is authorized to access. Upon determining the proper domain (e.g., domain 110), domain identifier module 312 may retrieve the corresponding configuration file 106.

In one embodiment, syntax abstraction module 314 determines if the syntax of the user request or command is proper for the corresponding domain 110. Syntax abstraction module 314 may compare the syntax of the received request or command to the proper syntax identified in the configuration file 106. For example, for a request to retrieve all users whose user names begin with "John," the user request may be provided in the common format (e.g., getUserByName(John)). The syntax used by directory server 107, however, may use a different syntax in order to perform the same query. For example, a syntax used by ActiveDirectory or FreeIPA may include GetUserByGuid(John), GetGroupByGuid(John), GetGroupByName(John), or GetUserByPrincipalName (John). In this case configuration file 106 may have an entry that specifies that the query getUserByName should be mapped to GetUserByGuid or other appropriate query. If the received request does not match the syntax specified in configuration file 106, syntax abstraction module 314 may either modify the query to have the proper syntax or generate a replacement query using the proper syntax which has the same object name (i.e., "John").

In one embodiment, schema abstraction module 316 determines if the object name and/or attributes specified in the user request or command are proper for the corresponding domain 110. Schema abstraction module 316 may compare the schema of the received request or command to the proper schema identified in the configuration file 106. For example, one possible attribute for a user object in the common format may be "Name." The schema used by directory server 107, however, may use a different attribute in order to store the same information, such as "givenname." In this case configuration file 106 may have an entry that specifies that the attribute Name should be mapped to givenname. If the received request does not match the schema specified in configuration file 106, schema abstraction module 316 may either modify the query to have the proper schema or generate a replacement query using the proper schema for directory server 107.

In one embodiment, LDAP interface module 318 applies the command or query to the LDAP repository managed by directory server after it has been converted to the proper syntax and schema. For example, LDAP interface module 318 may forward the command or query to directory server 107, where it is received by front end 201. In one embodiment, the front end of 201 of directory server 107 determines the type of incoming request (e.g., a search request (query) or an update command) and passes the parsed information to the back end 202. The update module 204 of back end 202 performs update operations (e.g., add, delete, modify) to the LDAP entries 230 in data store 105. The query module 207 may perform search operations on LDAP entries 230. In response to a query, back end 202 returns retrieved values to the front end 201 for transmitting a reply back to LDAP interface module 318.

In one embodiment, client interface module 320 forwards the reply back to the original requestor (e.g., client 101). If there was request for information, the reply may include the requested information. If there was a command to perform some operation, the reply may include an indication of the success or failure of the operation, as appropriate.

Figure 4:
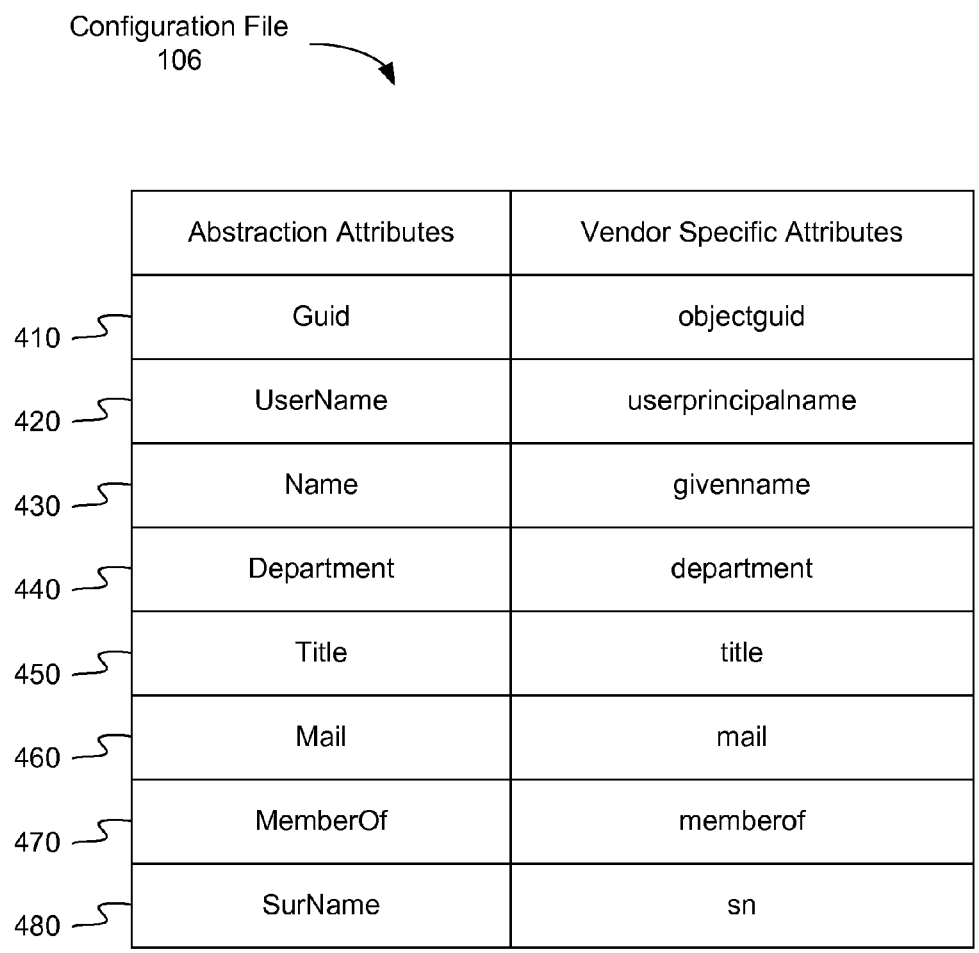
FIG. 4 is a block diagram illustrating a configuration file, according to an embodiment.

FIG. 4 is a block diagram illustrating a configuration file 106, according to an embodiment of the present invention. LDAP broker 109 maintains a series of mappings between the object names and attributes, the query syntax and the authentication protocols for domains 110, 120 and other domains in the network architecture 100. In one embodiment, the mappings are provided in a configuration file 106 that is stored, for example, in the LDAP repository in data store 105. Each directory server 107 may have a corresponding configuration file 106 that maps the vendor-specific schema, query syntax and authentication protocols into a common form that can be used by all domains. By having the mappings in a configuration file, rather than embedded in the actual code run by the directory server 107, it is significantly faster and easier to add support for a new vendor, since recompiling the code is not necessary.

FIG. 4 illustrates the mappings of several attributes names between the common abstraction format and the vendor specific format. In one embodiment, the illustrated entries 410-480 show mappings for attributes of a user object to the Microsoft Active Directory Schema. As shown some attributes have the same or similar names, such as department in entry 440, title in entry 450, mail in entry 460, and member of in entry 470. Other attributes, however, have different names, such as Guid and objectguid in entry 410, UserName and userprincipalname in entry 420, Name and givenname in entry 430, and SurName and sn in entry 480.

For other LDAP directory server vendors, a separate configuration file having mappings to other vendor specific attribute names may exist. For example, although not illustrated, the FreeIPA solution from Red Hat may include the following attributes corresponding to the abstraction attributes shown in FIG. 4: ipaUniqueId, KrbPrincipalName, givenname, department, title, mail, member of, and sn. The configuration file for a domain running FreeIPA may have a mapping from these attribute names to the abstraction attribute names.

In one embodiment, although not illustrated, the configuration file may also have mappings for the syntax of queries and commands that may be issued in the system. Some examples of the abstracted commands and queries include: rootDSE—Gets a meta-data object describing the domain; getUserByGuid—Gets a user according to the unique ID; getGroupByGuid—Gets a group according to the unique ID; getGroupByDN—Gets a group by its distinguished name (this name is like a full name, containing details about the organization name, unit name, and so on); getGroupByName—Gets a group by its simple name; getUserByPrincipalName—Gets a user by its principal name (principal name may be "john@acme.com", where username will be "john"); getUserByName—Gets a user by name; getGroupsByGroupNames—Gets a list of groups by group names; getUsersByUserGuids—Gets all users corresponding to a group of user Ids; searchUsers—a query that is used to provide any desirable search parameters, with a constraint that the objects returned will be users; and searchGroups—same as above, but for groups. The configuration file may list the vendor specific syntax for commands and queries that correspond to these abstractions.

Figure 5:
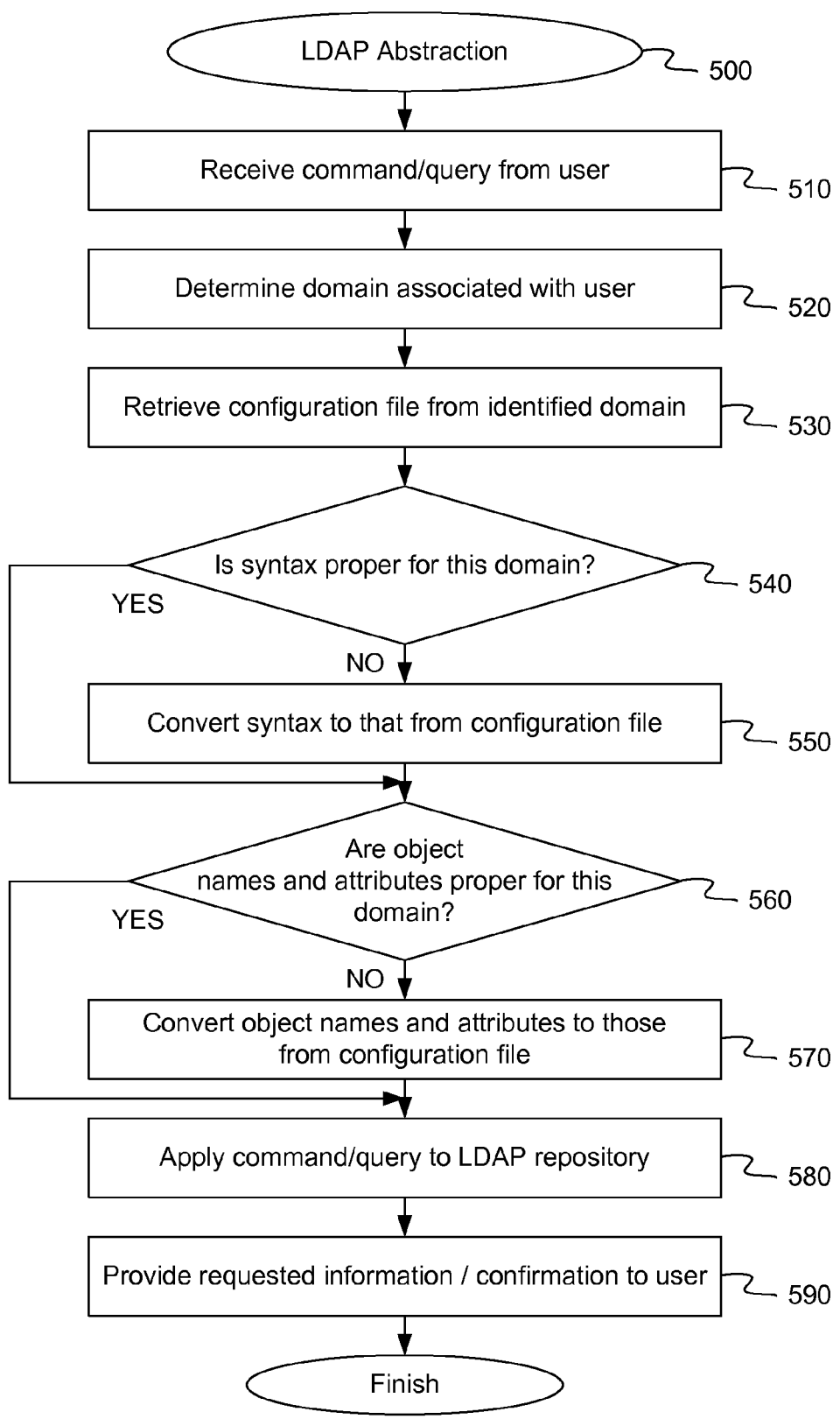
FIG. 5 is a flow diagram illustrating a method for schema and query syntax abstraction for different LDAP providers, according to an embodiment.

FIG. 5 is a flow diagram illustrating a method 500 for schema and query syntax abstraction for different LDAP providers. The method 500 may be performed by processing logic that may comprise hardware (e.g., circuitry, dedicated logic, programmable logic, microcode, etc.), software (e.g., instructions run on a processing device to perform hardware simulation), or a combination thereof. The processing logic may convert LDAP schema and query syntax from a common abstracted version to a vendor specific version used by an LDAP directory service. In one embodiment, the method 500 is performed by LDAP broker 109, as shown in FIGS. 1 and 3.

Referring to FIG. 5, at block 510, method 500 receives a command or query from a user. In one embodiment, client interface module 320 receives user information in response to the user logging in to a client device 101 or in response to the user issuing a request or command directed, for example, to a virtual machine 131, virtual disk 133, or one of directory servers 107, 127. In one embodiment, the user information may include an identifier (e.g., user credentials) of the user. If the user is already logged in to the management system, the user information may be accompanying a request or command to perform some action or retrieve some data.

At block 520, method 500 determines the domain associated with the user. In one embodiment, domain identifier module 312 determines which domain 110, 120 is associated with the user. In one embodiment, the user information includes an indicator of which domain the user is a member of or which domain the user is attempting to access. In another embodiment, domain identifier module 312 maintains a list or other data structure of which user's belong to which domains 110, 120. Thus, in response to receiving the user identifier, domain identifier module 312 can perform a look-up operation on the data structure to determine which domain or domains the user is a member of and/or which domains the user is authorized to access. At block 530, method 500 retrieves the configuration file from the identified domain. Upon determining the proper domain (e.g., domain 110) at block 520, domain identifier module 312 may retrieve the corresponding configuration file 106.

At block 540, method 500 determines if the syntax of the command/query is proper for the associated domain. In one embodiment, syntax abstraction module 314 determines if the syntax of the user request or command is proper for the corresponding domain 110. Syntax abstraction module 314 may compare the syntax of the received request or command to the proper syntax identified in the configuration file 106. For example, for a request to retrieve all users whose user names begin with "John," the user request may be provided in the common format (e.g., getUserByName(John)). The syntax used by directory server 107, however, may use a different syntax in order to perform the same query (e.g., getUser (John)).

At block 550, method 500 converts the syntax of the query to the proper syntax determined from the configuration file. In this case configuration file 106 may have an entry that specifies that the query getUserByName should be mapped to getUser. If the received request does not match the syntax specified in configuration file 106, syntax abstraction module 314 may either modify the query to have the proper syntax or generate a replacement query using the proper syntax which has the same object name (i.e., "John").

At block 560, method 500 determines if the object names and attributes are proper for the associated domain. In one embodiment, schema abstraction module 316 determines if the object name and/or attributes specified in the user request or command are proper for the corresponding domain 110. Schema abstraction module 316 may compare the schema of the received request or command to the proper schema identified in the configuration file 106. For example, one possible attribute for a user object in the common format may be "Name." The schema used by directory server 107, however, may use a different attribute in order to store the same information, such as "givenname."

At block 570, method 500 converts the object names and/or attributes to the proper schema determined from the configuration file. In this case configuration file 106 may have an entry that specifies that the attribute Name should be mapped to givenname. If the received request does not match the schema specified in configuration file 106, schema abstraction module 316 may either modify the query to have the proper schema or generate a replacement query using the proper schema for directory server 107.

At block 580, method 500 applies the command/query to the LDAP repository in the identified domain. In one embodiment, LDAP interface module 318 applies the command or query to the LDAP repository managed by directory server after it has been converted to the proper syntax and schema. For example, LDAP interface module 318 may forward the command or query to directory server 107, where it is received by front end 201. In one embodiment, the front end of 201 of directory server 107 determines the type of incoming request (e.g., a search request (query) or an update command) and passes the parsed information to the back end 202. The update module 204 of back end 202 performs update operations (e.g., add, delete, modify) to the LDAP entries 230 in data store 105. The query module 207 may perform search operations on LDAP entries 230. In response to a query, back end 202 returns retrieved values to the front end 201 for transmitting a reply back to LDAP interface module 318.

At block 590, method 500 provides a reply to the user. In one embodiment, client interface module 320 forwards the reply back to the original requestor (e.g., client 101). If there was request for information, the reply may include the requested information. If there was a command to perform some operation, the reply may include an indication of the success or failure of the operation, as appropriate.

Figure 6:
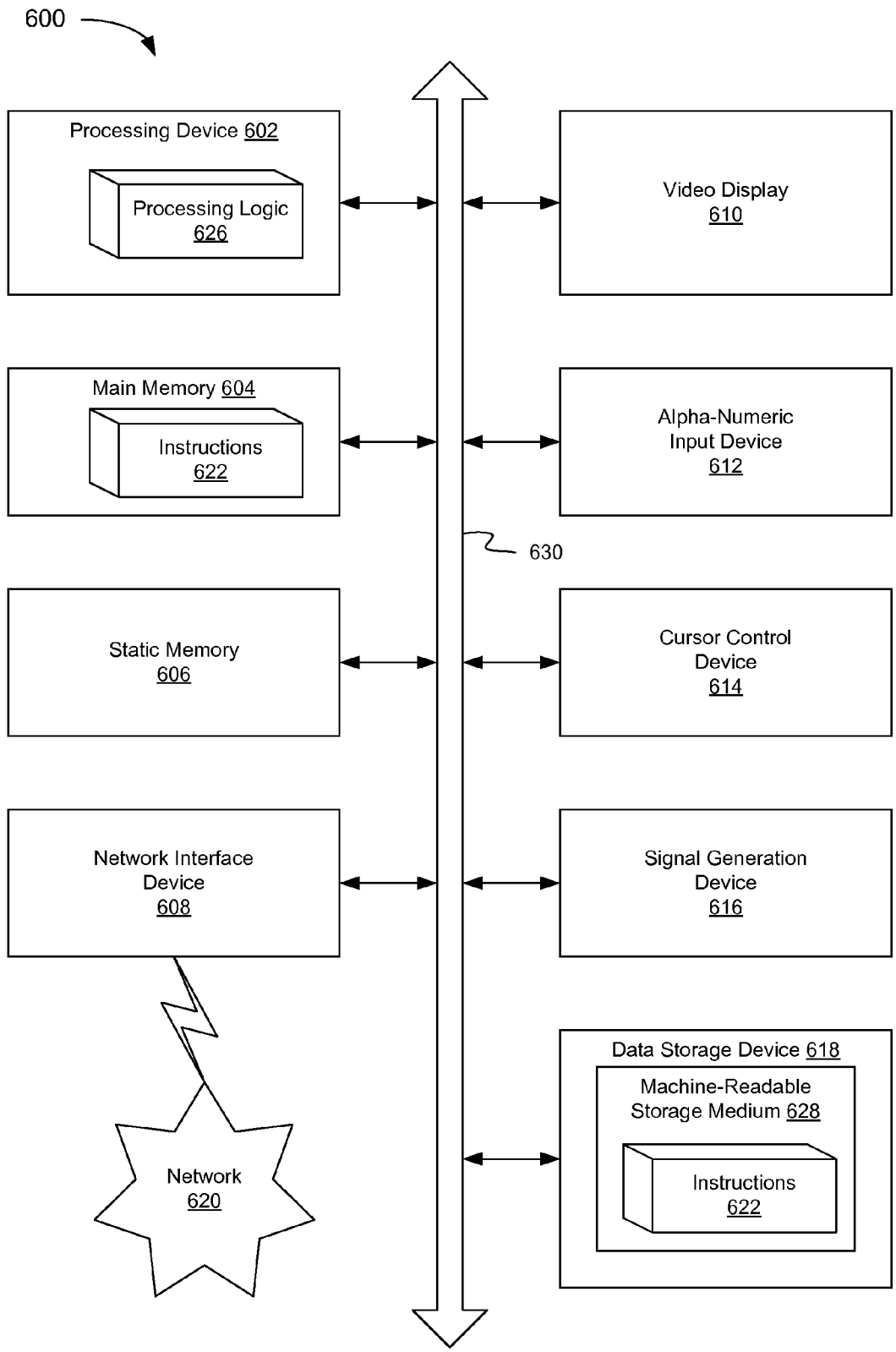
FIG. 6 is a block diagram illustrating a computer system, according to an embodiment.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a computing device, such as client 101, host server 103 or host controller 107 running virtualization manager 109.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 628, on which is stored one or more set of instructions 622 (e.g., software) embodying any one or more of the methodologies of functions described herein. The instructions 622 may also reside, completely or at least partially, within the main memory 604 and/or within the processing device 602 during execution thereof by the computer system 600; the main memory 604 and the processing device 602 also constituting machine-accessible storage media. The instructions 622 may further be transmitted or received over a network 620 via the network interface device 608.

The machine-readable storage medium 628 may also be used to store instructions for schema and query syntax abstraction for different LDAP service providers, as described herein. While the machine-readable storage medium 628 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method comprising:
    receiving, by a processing device, user information associated with a query for information in a lightweight directory access protocol (LDAP) repository, the query received in an abstraction format;
    determining, by the processing device, a computing domain in view of the user information;
    retrieving, by the processing device, a configuration file associated with the computing domain, the configuration file comprising a mapping for the query between an abstraction format and a vendor specific format; and
    converting, by the processing device, the query to the vendor specific format in view of the mapping in the configuration file.

2. The method of claim 1, wherein the mapping in the configuration file comprises at least one of LDAP schema, LDAP query syntax, or an LDAP authentication protocol.

3. The method of claim 1, wherein determining the computing domain comprises comparing a user identifier in the user information to a list of authorized user identifiers associated with the computing domain.

4. The method of claim 1, wherein the computing domain comprises a directory server, an authentication server, and the LDAP repository.

5. The method of claim 4, wherein the configuration file is stored in the LDAP repository.

6. The method of claim 1, further comprising:
    determining whether a syntax of the query matches a vendor specific syntax for the computing domain; and
    if the syntax of the query does not match the vendor specific syntax, converting the syntax of the query to the vendor specific syntax in view of the mapping in the configuration file.

7. The method of claim 1, further comprising:
    determining whether object and attribute names in the query match a vendor specific schema for the computing domain; and
    if the object and attribute names in the query do not match the vendor specific schema, converting the object and attribute names in the query to the vendor specific schema in view of the mapping in the configuration file.

8. A system comprising:
    a processing device; and
    a memory coupled to the processing device; and
    a lightweight directory access protocol (LDAP) broker, executable by the processing device from the memory, to:
        receive user information associated with a query for information in a lightweight directory access protocol (LDAP) repository, the query received in an abstraction format;
        determine a computing domain in view of the user information;
        retrieve a configuration file associated with the computing domain, the configuration file comprising a mapping for the query between an abstraction format and a vendor specific format; and convert the query to the vendor specific format in view of the mapping in the configuration file.

9. The system of claim 8, wherein the mapping in the configuration file comprises at least one of LDAP schema, LDAP query syntax, or an LDAP authentication protocol.

10. The system of claim 8, wherein to determine the computing domain, the LDAP broker to compare a user identifier in the user information to a list of authorized user identifiers associated with the computing domain.

11. The system of claim 8, wherein the computing domain comprises a directory server, an authentication server, and the LDAP repository.

12. The system of claim 11, wherein the configuration file is stored in the LDAP repository.

13. The system of claim 8, the LDAP broker further to:
   determine whether a syntax of the query matches a vendor specific syntax for the computing domain; and
   if the syntax of the query does not match the vendor specific syntax, convert the syntax of the query to the vendor specific syntax in view of the mapping in the configuration file.

14. The system of claim 8, the LDAP broker further to:
   determine whether object and attribute names in the query match a vendor specific schema for the computing domain; and
   if the object and attribute names in the query do not match the vendor specific schema, convert the object and attribute names in the query to the vendor specific schema in view of the mapping in the configuration file.

15. A non-transitory machine-readable storage medium storing instructions which, when executed, cause a processing device to perform a operations comprising:
   receiving user information associated with a query for information in a lightweight directory access protocol (LDAP) repository, the query received in an abstraction format;
   determining a computing domain in view of the user information;
   retrieving, by a processing device, a configuration file associated with the computing domain, the configuration file comprising a mapping for the query between an abstraction format and a vendor specific format; and
   converting the query to the vendor specific format in view of the mapping in the configuration file.

16. The non-transitory machine-readable storage medium of claim 15, wherein the mapping in the configuration file comprises at least one of LDAP schema, LDAP query syntax, or an LDAP authentication protocol.

17. The non-transitory machine-readable storage medium of claim 15, wherein determining the computing domain comprises comparing a user identifier in the user information to a list of authorized user identifiers associated with the computing domain.

18. The non-transitory machine-readable storage medium of claim 15, wherein the computing domain comprises a directory server, an authentication server, and the LDAP repository.

19. The non-transitory machine-readable storage medium of claim 18, wherein the configuration file is stored in the LDAP repository.

20. The non-transitory machine-readable storage medium of claim 15, further comprising:
   determining whether a syntax of the query matches a vendor specific syntax for the computing domain; and
   if the syntax of the query does not match the vendor specific syntax, converting the syntax of the query to the vendor specific syntax in view of the mapping in the configuration file.

21. The non-transitory machine-readable storage medium of claim 15, further comprising:
   determining whether object and attribute names in the query match a vendor specific schema for the computing domain; and
   if the object and attribute names in the query do not match the vendor specific schema, converting the object and attribute names in the query to the vendor specific schema in view of the mapping in the configuration file.

* * * * *